3,217,641
PLASTIC PRINTING PLATE METHOD AND PRODUCT
Daniel Louis Goffredo, 104 Main St., Riverton, N.J.
No Drawing. Filed Apr. 24, 1963, Ser. No. 275,217
8 Claims. (Cl. 101—395)

This invention relates to a new composition and method for the making of duplicate plastic printing plates of improved quality, strength, dimensional stability and simplicity of procedure.

The present duplicate printing plates are made of copolymers of vinyl acetate and vinylchloride, phenolic polymers, and the various rubbers, such as, buna S, GRS, and natural rubber.

These materials are made into duplicate plates by two molding operations.

The first molding operation is accomplished by placing the original printing plate upon a hydraulic press. A sheet of molding material is placed against the face of the original printing plate. A molding blanket may be placed on the molding material in order to assist in uniformly distributing the subsequent molding pressure. Then both heat and pressure are applied in order to force the molding material into the face of the original printing plate. After a required time cycle the molded material is removed from the hydraulic press. This mold is called a matrix and is the opposite of the original printing plate.

The second molding operation is now preformed against the matrix. The matrix is placed upon the hydraulic press and molding material is placed on the face of the matrix. The molding material may be in sheet form or in a granular form. A molding blanket may be placed on top of the molding material in order to assist in uniformly distributing the subsequent molding pressure. Then both heat and pressure are applied to force the molding material into the face of the matrix. After a required time cycle the molded material is removed from the hydraulic press. This mold is called a duplicate plate and is a duplicate of the original printing plate. Many duplicate plates are made from a single matrix.

Because of the solid nature of the present duplicate plate molding materials, high pressures and temperatures are required to make them sufficiently fluid to mold duplicate plates. This severely limits the ability, of the present materials, to reproduce fine halftones and fine lines, because the solid nature of the material will not allow it to flow into very small areas. Also, there is shrinkage or distortion in the molding materials when the molding pressures and temperatures are relieved, this further limits the reproductive quality of the present duplicate plate materials and method to the coarser type of printing work.

Because of the method that must be employed, expensive hydraulic molding and heating equipment must be used. Pressures of several hundred pounds per square inch and temperatures of several hundred degrees Fahrenheit must be simultaneously directed at the molding material and printing plate to be reproduced. The total pressure required to mold the larger duplicate plates needed by the printing industry amounts to forces of many tons. This pressure creates many problems for the molder, who generally must unlock type forms before molding, lest the molding pressure ruptures them. The molder must be careful not to mash the type metal characters. The high pressures and temperatures will often cause zinc engravings to become distorted and lose register, which in turn, seriously interfere with the quality of color printing. Wood cuts are difficult to reproduce because of their sensitivity to pressure and temperature. The abusive action of pressure and temperature causes wear on the original printing form in the making of the matrix. And, also, it seriously limits the number of times a single matrix can be used in making duplicate plates. Consequently, the present process for making duplicate printing plates of plastic and rubber requires expensive equipment, a great deal of care, and is limited to the coarser types of printing reproductions. Also, the duplicate plate size is limited by the platen size on the hydraulic press. The larger size available hydraulic presses are designed to a maximum molding pressure of 700 tons for a platen size of 36 inches by 48 inches.

The present duplicate plates must then go through finishing operations such as routing or grinding to finished tolerances. The plates must be held against a flat or curved surface for routing or grinding. Adhesives or vacuum equipment are used to hold the plates in position but both of these have their problems. Adhesives must be applied uniformly, are sensitive to temperature, and must be removed. Vacuum equipment requires care and becomes very expensive to apply to revolving cylinders such as those now used to grind rubber plates.

Finally, the finished plate is positioned on the press ready for printing. Plates must be held in position by some sort of lock up. Mechanical clips are used for rigid plates and adhesives are used for flexible plates.

It is the principal object of this invention to provide a composition and method for making plastic duplicate printing plates of exceptional reproductive quality. Another object of this invention is to provide plastic duplicate printing plates of improved strength and dimensional stability. Another object of this invention is to provide a simplified method of making plastic duplicate printing plates. A further object of this invention is to provide a plastic duplicate printing plate that can be magnetically held in place while molding, routing, grinding or printing.

This invention is directed to a printing plate composition and molding technique based upon liquid casting resins and magnetic powder. The magnetic powder can be mixed into the casting resin before molding. This composition has improved flow and mold wetting characteristics and hence, will reproduce the smallest details in the finer halftones and finer line work. Under the influence of a magnetic force the suspended magnetic powder can be made to concentrate at the surface of the printing plate, or to orient themselves into a selected pattern. This will product a highly filled plastic region at the immediate printing surface giving a hard surfaced printing plate of exceptional printing quality and durability while the remainder of the plate can remain a less filled and more flexible region.

This composition, before hardening, can be made to very low viscosity and be readily poured onto the form to be reproduced. Additional magnetic powder can be subsequently added and forced to migrate to the printing surface by means of magnetic attraction. Simple casting techniques can be used. Since no pressure is required expensive hydraulic molding equipment is not needed.

This composition, because of its hagnetic property, allows the use of magnetic force to hold the matrix flat while molding. This magnetic composition allows the use of magnetic force to hold the plate during finishing operations such as routing and grinding. This magnetic composition, also, allows the use of magnetic force to hold the plate on the press while printing. This magnetic compostiion allows economies in labor and equipment during molding, finishing, and printing operations.

This composition described herein comprises liquid casting resins such as epoxy, polyester and polyurethanes along with their curing agents. And, also, thermoplastic compositions that are liquid at room temperature such as vinyl dispersions This composition, also, comprises magnetic particles.

These particles can attract, or be attracted by, magnetic substances; that is, they can be either magnets or magnetic. Examples of these particles are the naturally occurring minerals such as magnetite, pyrrhotitie and ilmenite; the ferromagnetic metals, such as iron, cobalt and nickel; the soft magnetic materials such as the substantially unalloyed irons and Permalloy; the hard permanent magnetic alloys, such as carbon steel, tungsten steel, cast alnico and sintered alnico; also, the relatively new class of magnetic materials, such as nickel ferrite, manganese ferrite and combinations of these ferrites with zinc, magnesium and other elements; and, also, the other materials that are not magnetic by themselves but become magnetic by alloying with other non-magnetic elements, such as the Huesler alloys. The preferred size of these magnetic particles is below one hundred mesh but larger size particles can be used. The larger size particles lose their effectiveness in hardening the printing surface but do retain their effectiveness in making the plastic plate magnetic. The magnetic powder can be suspended in the liquid casting resin before casting. The suspension can be made stable by adding suspending agents such as colloidal clay. Or the magnetic powder can be added later in the casting operation. Plasticizers or flexibilizers can be added to the casting resins to produce flexible or even very soft plastic systems for flexible printing plates, the concentration of the magnetic powder at the printing surface will keep the printing surface firm. Fillers and reinforcing agents may be added to reduce cost and increase strength.

The method of this invention consists of laying down the matrix to be reproduced onto a magnetic table and surrounding the matrix with some sort of barrier to retain the liquid plastic. The composition of liquid plastic and magnetic material is poured onto the matrix. The attraction of the magnetic field causes the magnetic powder to migrate toward the face of the matrix and, hence, produce a printing surface rich in magnetic material. The magnetic force, also, keeps the matrix in position. A variation that may be employed is to brush or spray the liquid plastic against the plate and then add the magnetic powder or a mixture of plastic and magnetic powder.

The following examples will describe my invention in greater detail;

*Example 1*

| | Parts by weight |
|---|---|
| Flexible curing polyester resin | 100 |
| Magnetic iron oxide powder | 50 |
| Methylethyl ketone peroxide | 2 |
| 6% cobalt naphthenate | 0.5 |

The magnetic iron oxide was stirred into the polyester resin by means of a propellor mixer and then the peroxide and naphthenate were added.

A vinyl electrotyper's matrix was set over a magnetic table and surrounded with a barrier dam. The above mixture was poured onto the matrix. The magnetic attraction between the magnetic table and the iron oxide in the casting resin held the matrix flat. The resin hardened within 15 minutes at room temperature.

On removal from the matrix, the plastic plate was found to be an excellent reproduction of the original and to be flexible. Close examination showed the printing surface to be much harder than the opposite side of the plate. This plate was also found to be magnetic, that is, it could be held in place by a magnetic chuck while routing, grinding and printing.

*Example 2*

| | Parts by weight |
|---|---|
| Epoxy resin | 100 |
| Polysulfide | 75 |
| Triethylene tetramine | 10 |
| Iron powder | 100 |

A newspaper matrix was held flat on a vacuum table fitted with a magnet. The above mixture, without the iron powder added, was sprayed against the face of the matrix to coat it to a thickness of about 0.003″ thick.

The iron powder was then mixed into the liquid resin by means of a propellor mixer and it was then poured over the matrix.

This plate was cured within 30 minutes by heating to 170° F.

On removal from the matrix, this plastic plate was found to have a hard printing surface but a much softer back surface. It was found to easily hold in place by magnetic force while routing, grinding, and printing.

*Example 3*

| | Parts by weight |
|---|---|
| Liquid urethane elastomer | 100 |
| 4,4′ methylene-bis-(2 chloroaniline) | 29 |
| Small Permalloy magnets | 100 |

The Permalloy magnets were stirred into the above mixture. A vinyl electrotyper's matrix was laid onto a vacuum table and surrounded by a barrier dam. The above mixture was poured over the matrix. The system was heated to 200° F. and cured within a half hour.

On removal from the matrix, the plastic plate was found to be rigid and to be a magnet.

*Example 4*

| | Parts by weight |
|---|---|
| Dispersion grade vinyl resin | 50 |
| Epoxidized soy bean oil | 4 |
| Butyl benzylphthalate | 25 |
| 2 ethyl hexylphthalate | 21 |
| Silica flour | 15 |
| Iron powder | 100 |

A newspaper matrix was held flat on a vacuum table and was brushed with a thin coating of the above mixture before the iron powder was mixed into it.

The iron powder was then stirred into the above mixture with some kneading action. This mixture was then troweled over the matrix. The system was heated to 350° F. for 15 minutes. The resulting plastic plate could be held in place by magnetic force when routing, grinding and printing.

The above examples serve to demonstrate the utility and versatility of my invention whereby the named plastics can be used to make magnetic printing plates. The versatility of this invention allows soft and flexible plastic printing plates to be made with hard printing surfaces.

While I have specifically described my invention in terms of polyester, epoxy, polyurethane and vinyl plastics, it becomes obvious that other suitable plastics can be used. Such plastics as can be made sufficiently liquid to disperse magnetic powder into them and to allow for casting techniques at room temperature or elevated temperatures. These can be hot melts of cellulose acetate butyrate, polyamide, polyethylene or polypropylene. These can, also, be selected from phenolics, acrylics or the liquid rubbers. While I have described the magnetic material used as iron powder and magnetic iron oxide, it is understood that other magnetic materials can be used such as the various magnetic alloys.

While I have described by invention in terms of making a duplicate plate, it can be readily seen that matrices could just as well be made by this process. Extremely hard matrices could be made by this process and would be advantageous for certain molding requirements. So when the term printing plate is used, it is implied and understood to, also, include matrices.

While I have described my invention in terms of systems cast at atmospheric pressure, it can be seen that the use of higher pressures will allow more viscous plastic systems to be used and still stay within the scope of my invention.

While I have described my invention in terms of making printing plates, it becomes obvious that this invention can be used to make printing cylinders such as now used on tubular presses and in textile and gravure printing. So, when the term printing plate is used, it is implied and understood to include printing cylinders.

I claim as my invention:

1. The method of making a hard surfaced printing plate by forming a liquid synthetic resin with magnetic attractable powder of not greater than about 100 mesh particle size dispersed in it, casting the liquid resin composition against a printing matrix, applying magnetic force from the other side of the matrix to cause the magnetic attractable powder to migrate towards the printing surface and to become predominantly concentrated at the printing surface, and then solidifying the liquid resin to produce a printing plate with a surface stratum containing the magnetic attractable powder and a softer body portion.

2. The method according to claim 1 wherein the synthetic resin is made liquid by heating to an elevated temperature, dispersing the magnetic powder in it, and then is made to solidify by cooling to room temperature.

3. The method according to claim 1 wherein the synthetic resin is a liquid thermosetting resin composition containing a curing agent and that is made to solidify by polymerization.

4. The method according to claim 1 wherein the synthetic resin is a liquid vinyl dispersion that is made to solidify by heating.

5. The printing plate formed by the method according to claim 1.

6. The printing plate formed by the method according to claim 2.

7. The printing plate formed by the method according to claim 3.

8. The printing plate formed by the method according to claim 4.

References Cited by the Examiner

UNITED STATES PATENTS

| | | | |
|---|---|---|---|
| 1,707,729 | 4/1929 | Kelly | 101—401.1 |
| 2,108,822 | 2/1938 | Lippincott | 101—401.1 |
| 2,571,397 | 10/1951 | Wells. | |
| 2,942,544 | 6/1960 | Williams | 101—382 |
| 2,959,832 | 11/1960 | Baermann | 24—201 |
| 2,982,207 | 5/1961 | Stromme | 101—401.1 X |
| 3,031,959 | 5/1962 | Libberton | 101—401.1 X |
| 3,039,389 | 6/1962 | Meese et al. | 101—378 |
| 3,055,297 | 9/1962 | Leeds | 101—327 |
| 3,061,888 | 11/1962 | Wadham. | |
| 3,098,401 | 7/1963 | Breeze et al. | 264—24 |
| 3,113,514 | 12/1963 | Hogan | 101—395 |
| 3,147,705 | 9/1964 | Broderick et al. | 101—395 X |

FOREIGN PATENTS

| | | |
|---|---|---|
| 489,948 | 8/1938 | Great Britain. |
| 614,993 | 12/1948 | Great Britain. |

OTHER REFERENCES

Gardner, A. R., What You Can Do With Flexible Magnets in Product Engineering, pages 65–68, January 9, 1961.

DAVID KLEIN, *Primary Examiner.*

WILLIAM B. PENN, *Examiner.*